G. F. BARNES.
LEAF HOLDER FOR BOOKS.
APPLICATION FILED JUNE 18, 1913. RENEWED APR. 29, 1915.
1,160,237.
Patented Nov. 16, 1915.
5 SHEETS—SHEET 1.
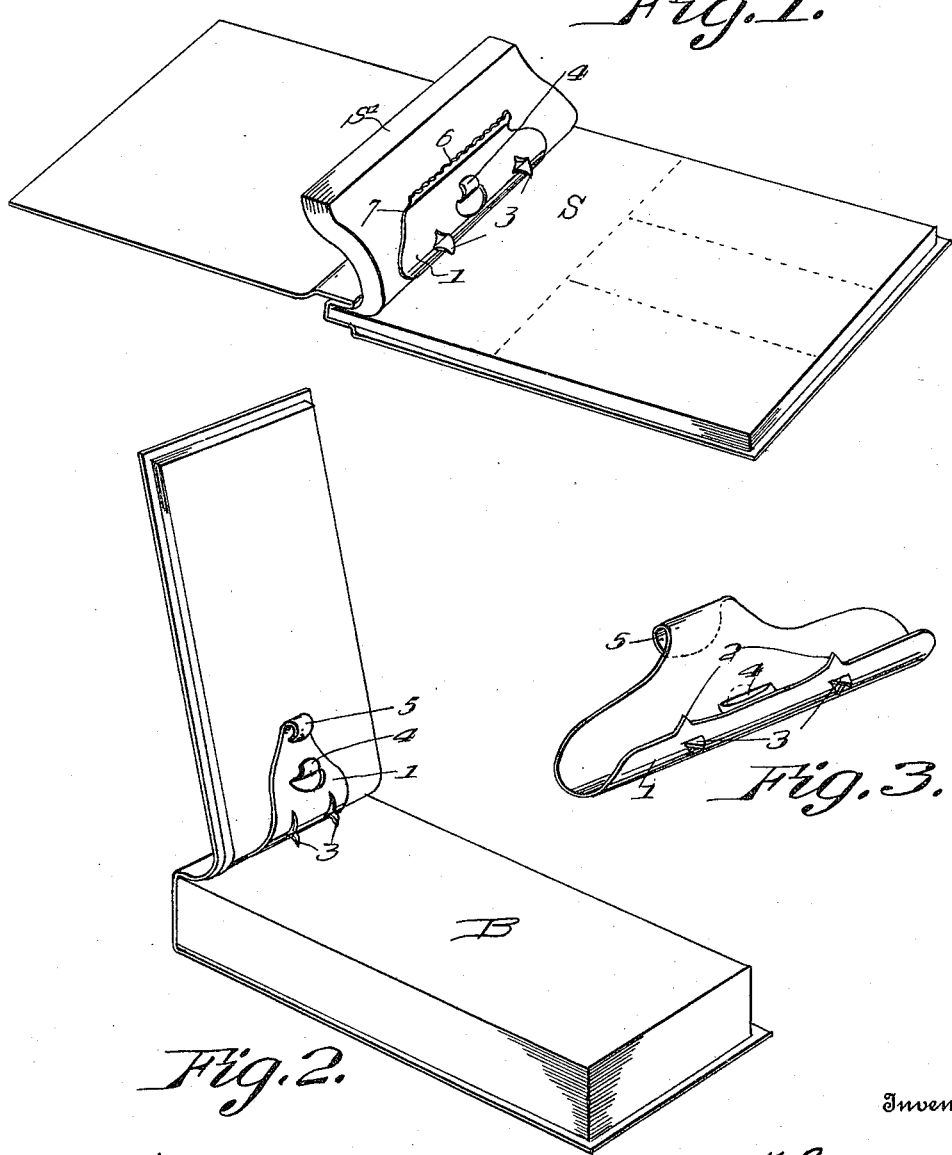

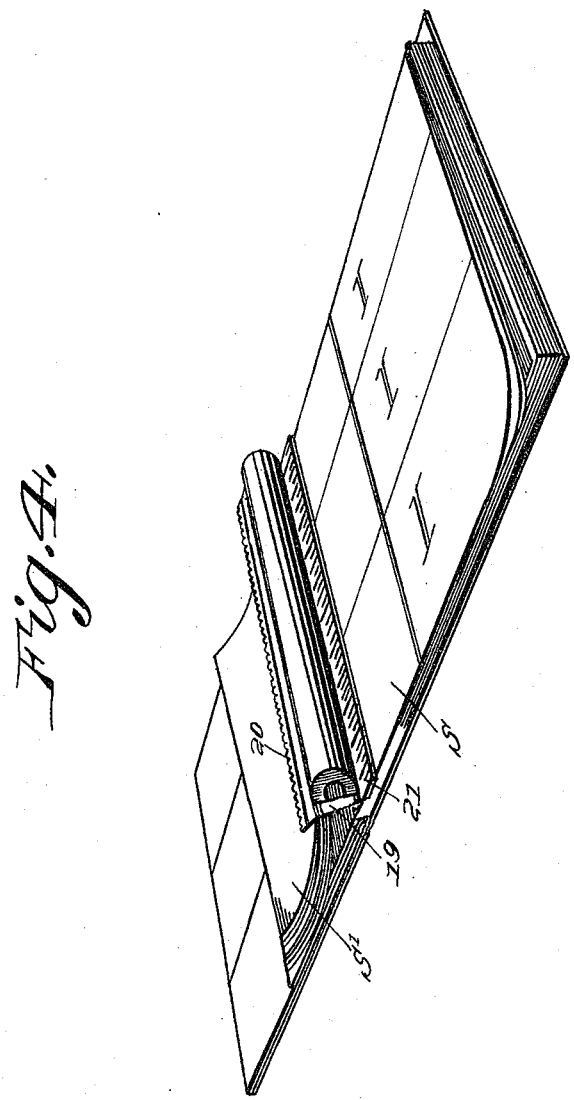

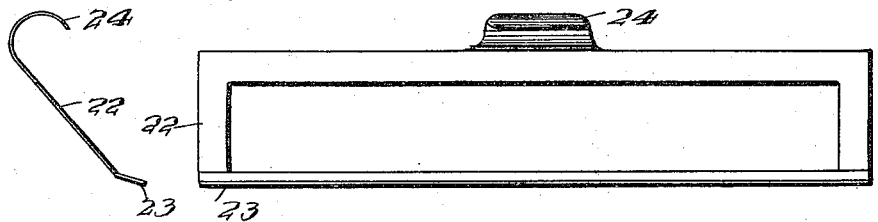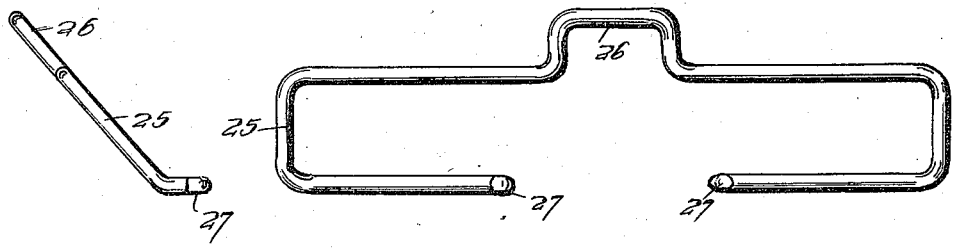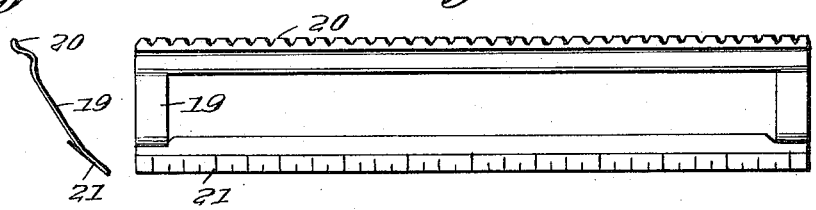

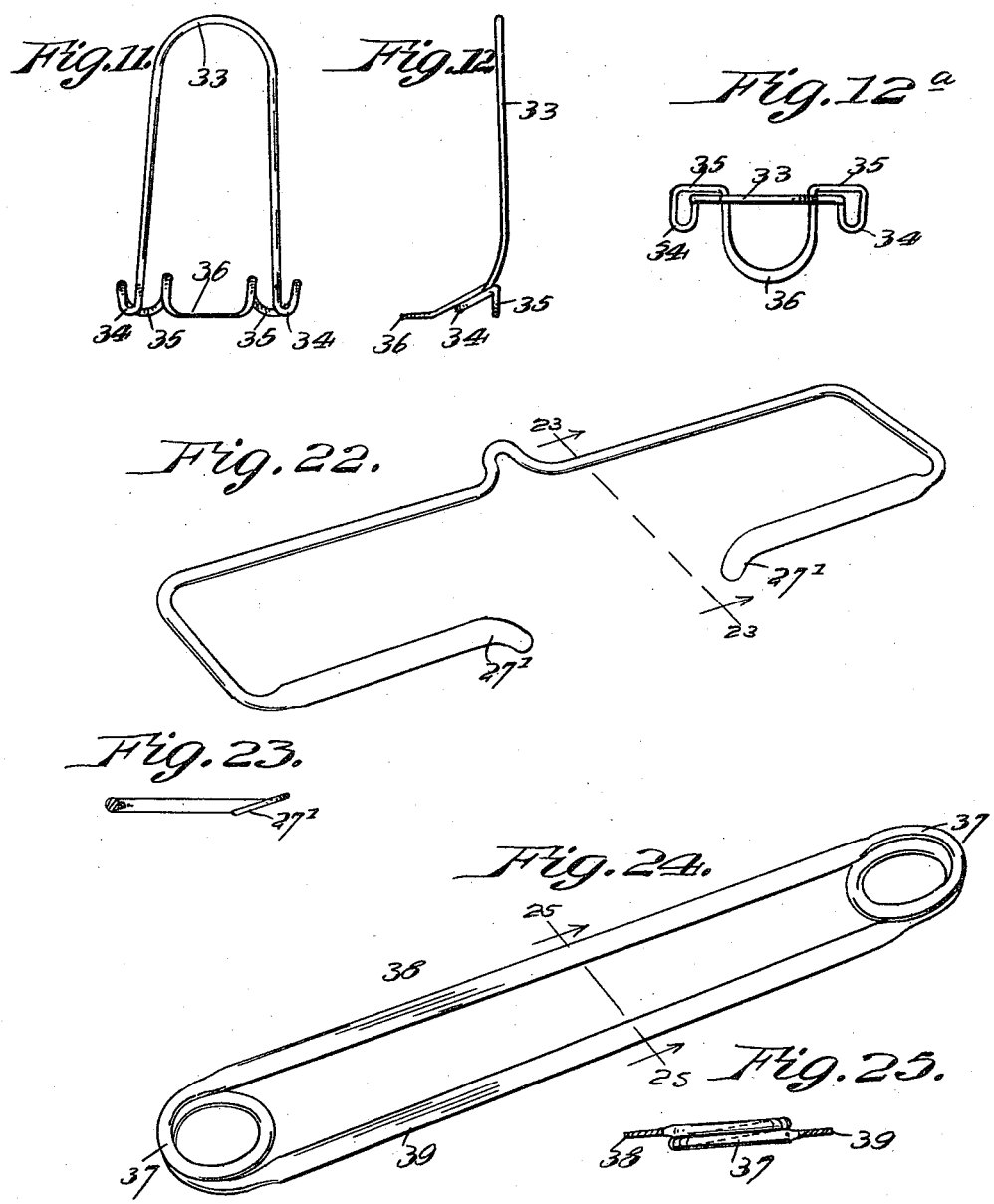

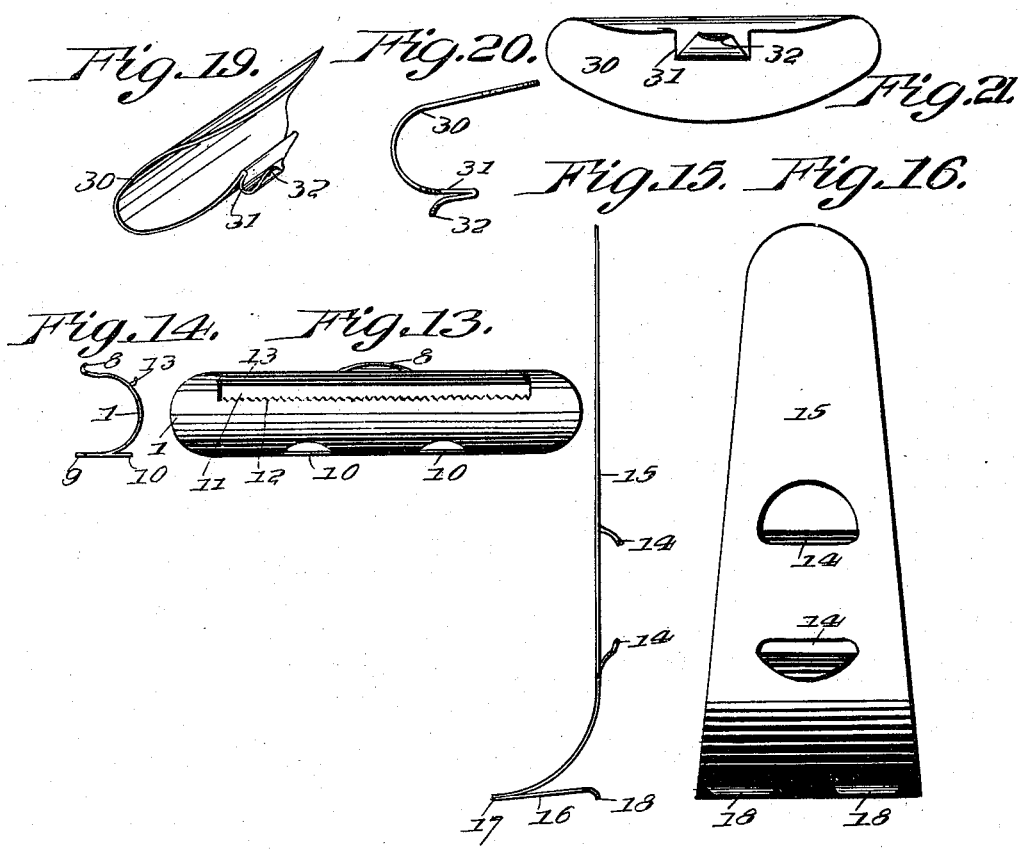

UNITED STATES PATENT OFFICE.

GEORGE F. BARNES, OF PHOENIX, ARIZONA.

LEAF-HOLDER FOR BOOKS.

1,160,237. Specification of Letters Patent. Patented Nov. 16, 1915.

Application filed June 18, 1913, Serial No. 774,343. Renewed April 29, 1915. Serial No. 24,805.

*To all whom it may concern:*

Be it known that I, GEORGE F. BARNES, a citizen of the United States, residing at Phoenix, in the county of Maricopa and State of Arizona, have invented new and useful Improvements in Leaf-Holders for Books, of which the following is a specification.

This invention relates to certain new and useful improvements in leaf holders for books and more particularly relates to a holder which is employed to retain a leaf or leaves in a substantially vertical or other position from the other leaf or leaves which latter remain in normal horizontal position.

The invention is designed more particularly for use in connection with check books, bill files, and the like, and where used in check books, it performs the function of retaining the used stubs in a position to expose the uppermost unused stub, to allow the latter to have the usual memoranda inscribed thereon.

In the drawings: Figure 1 is a perspective view of a check book showing the invention applied thereto, as in actual use; Fig. 2 is a similar view of a bill file, showing a modified form of the invention; Fig. 3 is a detail perspective view of the rear of a still further modified form of the invention; Fig. 4 is a perspective view of a modified form of the invention in use with a check book; Fig. 5 is a front elevation of another form of the invention for use with a check book; Fig. 6 is an end elevation of Fig. 5; Fig. 7 is a front elevation of a further modified form of the invention for use with a check book; Fig. 8 is an end elevation of Fig. 7; Fig. 9 is a front elevation of a still further modified form of the invention for use with a check book; Fig. 10 is an end elevation of Fig. 9; Fig. 11 is a front elevation of a modified form of wire holder of the type of holder for use with narrow books, shown in Fig. 2; Fig. 12 is a side elevation of Fig. 11; Fig. 12ª is a top plan view of Fig. 11; Fig. 13 is a modified form of the type of holder shown in use in Fig. 1; Fig. 14 is an end elevation of Fig. 13; Fig. 15 is an end elevation of a further modified form of the invention showing another form of holder for use in connection with the type of hook shown in Fig. 2 of the drawings; Fig. 16 is a front elevation of Fig. 15; Fig. 17 is a front elevation of a still further modified form of holder for use with check books; Fig. 18 is an end elevation of Fig. 17; Fig. 19 is a perspective view of a further modified form of holder of the general type of holder shown in Fig. 1; Fig. 20 is an end elevation of Fig. 19; Fig. 21 is a bottom plan view of Fig. 19; Fig. 22 is a perspective view of a further modified form of holder of the general type shown in Fig. 7; Fig. 23 is a section on the line 23—23 of Fig. 22; Fig. 24 is a further modified form of holder of the type shown in Fig. 4; and Fig. 25 is a section taken on the line 25—25 of Fig. 24.

The invention primarily consists of a base element that engages and seats on the uppermost leaf of the flat leaves of an open book, and a second element which engages the next adjacent leaf of other leaves that have been raised up from the flat leaves, and sustains the raised leaves in raised position.

The leaf holder depicted in Figs. 1, 2 and 3, of the drawings, is formed of or bent from a section of sheet metal, the latter having a curved body portion 1 which is formed at its free lower edge with prongs 2 that engage between the raised stub S', and the uppermost flat stub S, the curved body receiving and engaging the used stubs S'.

The lower side portion of the body is provided with depending feet 3, which latter are preferably in the form of triangular shaped prongs that are struck-out from the body and engage the uppermost stub S, the pressure of the stubs against the body acting to force the prongs or feet 3 to bite into the stubs S whereby the holder retains the used stubs S' in the position depicted in Fig. 1 of the drawings.

The body 1 preferably has a struck-out part 4 that forms a finger engaging means to allow the holder to be more readily placed in position.

In Fig. 3 of the drawings the upper side portion of the body is shown as provided with a finger engaging portion 5 that is in the form of a lip bent from the body to extend on the front face of the latter to coöperate with the finger engaging means 4 to provide a pair of finger engaging means which allow the holder to be placed in position.

In the form of the invention depicted in Fig. 2, the holder is constructed identically like the holder illustrated in Fig. 3, excepting that the body is possessed of less width, or is made narrower to conform to the bills B which have less width than the leaves of check books.

If desired, the finger engaging lip 5, in a holder designed for use in check books may be formed with an elongated longitudinal upper offset portion, the edge 6 of which is corrugated, so that the holder may be placed on the checks by engaging the shoulder 7 of the holder with the checks, whereupon a pen may be engaged with the corrugated edge 6 and drawn thereon to line the checks, as is customary. The shoulder 7 is formed by the offset portion that has the corrugated edge 6, the corrugations causing the line marked on the check to be wavy.

In Figs. 13 and 14, of the drawings, the curved body 1 has a finger grip 8 at its top, the body having a single central forwardly extending part 9, and oppositely extending struck-out feet 10, which feet 9 and 10 seat on the uppermost stub of the flat checks. In this form of the invention, a longitudinal slot 11 is formed in the body of a size to admit a pen holder, the edge 12 of the wall formed by the slot being corrugated to allow checks to be marked with wavy lines. The metal displaced by the formation of the slot is bent upwardly at 13 to provide a finger grip for coöperation with the finger grip 8.

In Figs. 17 and 18 the holder is like that shown in Figs. 13 and 14 excepting that the body has a pair of forwardly extending feet 9' like the prongs 2, 2, in Fig. 3, instead of the single central foot 9, in Figs. 13 and 14, and in addition the feet 10' are curved downwardly, the feet 9' being arranged in alinement with the feet 10'.

In Figs. 15 and 16, the holder is for use with narrow books of the type shown in Fig. 2, and is formed of sheet metal having adjacent finger grips 14 struck out from the body 15. The lower end portion of the body is curved inwardly and then bent at right angles to the body to form a base 16, the forward end 17 of which engages in the space between the flat and raised leaves, the rear end being formed with feet 18 which seat on top of the uppermost flat leaf.

In Figs. 4 to 9, inclusive, the holder is slotted to permit the doubled used stubs to be received in the slot.

In Figs. 4, 9, and 10, the holder is formed of an open frame 19, having an offset corrugated edge 20, the lower side of the frame having an inclined part 21 which may have graduations marked thereon, and which seats on the uppermost flat leaf to hold the used stubs flat, as shown.

In Figs. 5 and 6 the open frame 22 has an inclined base 23 and in lieu of the corrugated edge shown in Figs. 4, 9, and 10, has a curved finger piece or grip 24.

In Figs. 7 and 8, the holder is formed of a strand of wire, bent to form an open rectangular frame 25 that has a loop 26, providing a finger grip, the ends of the wire being bent at an angle to the plane of the frame to form a pair of spaced curved feet 27 for seating on an uppermost flat leaf.

In Figs. 19, 20, and 21, the holder is of the general type depicted in Fig. 1, in which a curved body 30 receives the stubs S', the lower end of the body being reduced at 31, and doubled upon itself and has its free end extending downwardly to provide a foot 32 which will engage with the uppermost unused stub S.

In Figs. 11, 12, and 12ª, the form of holder is of the general type disclosed in Figs. 15 and 16, in which former figures however, the entire structure is formed of a single piece of wire which is bent to form a vertical arch 33, the ends of the arch being looped at 34 and then being further looped at 35 to form a pair of spaced feet, the feet being extended to provide a rearwardly extending central loop 36, which loop 36 engages at the points of binding between a raised leaf and the adjacent flat leaf, the feet 35 seating on the said flat leaf. It will also be seen that the loops 34 engage the leaves mentioned at the same points that the loop 36 engage said leaves.

The form displayed in Figs. 22 and 23, is generally like that shown in Figs. 7 and 8, with the exception that the free end portions of the frame and the feet 27' are flattened, the free end portions being angularly related to the plane of the frame, as depicted in Fig. 23.

In Figs. 24 and 25, the holder is of the general type shown in Figs. 5 and 6; in said Figs. 24 and 25, the open frame is formed of a single piece of metal having its ends welded, the ends of the frame being formed by coiling the piece of metal at 37, the upper and lower sides 38 and 39 respectively of the frame being flattened and offset relative to each other so as to engage with a check book in the manner substantially as shown in Fig. 1.

What is claimed is:

1. A leaf holder for connected leaves consisting of a rigid body member which when in operative position has a part that is vertically disposed and is for engagement with the lowermost leaf of a series of leaves which latter are raised up from the flat leaves, the lower end of the body being concaved to receive and engage said lowermost raised leaf and having its free edge for wedging engagement between said lowermost raised leaf and the uppermost flat leaf directly at the points of connection of said leaves, and means carried by the body and arranged to the rear of said free edge of the lower end of the body and depending therefrom to seat on the uppermost flat leaf to hold said body in operative position.

2. A leaf holder for connected leaves consisting of a rigid body member which when in operative position has a part that is vertically disposed and is for engagement with the lowermost leaf of a series of leaves which latter are raised up from the flat leaves, the lower end of the body being concaved to receive and engage said lowermost raised leaf and having its free edge for wedging engagement between said lowermost raised leaf and the uppermost flat leaf directly at the points of connection of said leaves, and a pair of spaced feet which depend from the body to seat on the uppermost flat leaf to hold said body in operative position.

3. In a leaf holder for connected leaves, a concaved body having a free lower edge for engagement directly at the points of connections of the leaves, said body having a rearwardly extending finger grip formed at its free upper edge and having a second struck-out finger grip which is spaced from and located below said first named finger grip, and prongs struck-out from said body and depending therefrom to seat on the uppermost leaf of a series of flat leaves, the front face of the body being for engagement with the lowermost leaf of a series of raised leaves.

4. A leaf holder for connected leaves, including a body having a vertical part which terminates in an outwardly extended lower portion the free edge of which lower portion is for wedging engagement on top of a lower leaf and beneath a leaf raised up from the lower leaves directly at the points of connections between the leaves, and means on the body arranged to the rear of the free edge of said lower portion to engage on the top face of the lower leaf at points adjacent the points of connection between the leaves to hold the body in vertical position and to hold the raised leaf up so as to expose the entire upper face of the uppermost lower leaf.

In testimony whereof I have hereunto set my hand in presence of two subscribing witnesses.

GEORGE F. BARNES.

Witnesses:
C. E. JOHNS,
FRED B. TOWNSEND.

Copies of this patent may be obtained for five cents each, by addressing the "Commissioner of Patents, Washington, D. C."